(12) United States Patent
Jun et al.

(10) Patent No.: US 12,084,738 B2
(45) Date of Patent: Sep. 10, 2024

(54) METHOD FOR PRODUCING A STEEL SHEET HAVING IMPROVED STRENGTH, DUCTILITY AND FORMABILITY

(71) Applicant: ArcelorMittal, Luxembourg (LU)

(72) Inventors: Hyun Jo Jun, East Chicago, IN (US); Pavan Venkatasurya, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 423 days.

(21) Appl. No.: 16/064,513

(22) PCT Filed: Dec. 21, 2016

(86) PCT No.: PCT/EP2016/082192
§ 371 (c)(1),
(2) Date: Jun. 21, 2018

(87) PCT Pub. No.: WO2017/108956
PCT Pub. Date: Jun. 29, 2017

(65) Prior Publication Data
US 2019/0003005 A1   Jan. 3, 2019

(30) Foreign Application Priority Data
Dec. 21, 2015   (WO) .................. PCT/IB2015/059837

(51) Int. Cl.
| | | |
|---|---|---|
| *C21D 9/46* | (2006.01) | |
| *B32B 15/01* | (2006.01) | |
| *B32B 15/18* | (2006.01) | |
| *C21D 1/22* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/26* | (2006.01) | |
| *C23C 2/00* | (2006.01) | |
| *C23C 2/02* | (2006.01) | |
| *C23C 2/06* | (2006.01) | |
| *C23C 2/28* | (2006.01) | |
| *C23C 2/40* | (2006.01) | |

(52) U.S. Cl.
CPC ............. *C21D 9/46* (2013.01); *B32B 15/013* (2013.01); *B32B 15/18* (2013.01); *C21D 1/22* (2013.01); *C21D 6/001* (2013.01); *C21D 6/002* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0236* (2013.01); *C22C 38/001* (2013.01); *C22C 38/02* (2013.01); *C22C 38/04* (2013.01); *C22C 38/06* (2013.01); *C22C 38/26* (2013.01); *C23C 2/00* (2013.01); *C23C 2/0224* (2022.08); *C23C 2/06* (2013.01); *C23C 2/28* (2013.01); *C23C 2/29* (2022.08); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | | |
|---|---|---|---|---|
| 5,123,969 A | * | 6/1992 | Chou ...................... | C22C 38/00 148/328 |
| 6,264,770 B1 | * | 7/2001 | Hong ....................... | C21D 1/78 148/663 |
| 9,121,087 B2 | | 9/2015 | Matsuda et al. | |
| 9,200,343 B2 | | 12/2015 | Matsuda et al. | |
| 2004/0074575 A1 | | 4/2004 | Kashima et al. | |

(Continued)

FOREIGN PATENT DOCUMENTS

| | | |
|---|---|---|
| CN | 102639739 A | 8/2012 |
| CN | 102884218 A | 1/2013 |

(Continued)

OTHER PUBLICATIONS

Santofimia et al. New low carbon Q&P steels containing film-like intercritical ferrite. Materials Science and Engineering A 527 (2010) 6429-6439 (Year: 2010).*

(Continued)

*Primary Examiner* — Paul A Wartalowicz
*Assistant Examiner* — Stephani Hill
(74) *Attorney, Agent, or Firm* — Davidson Kappel LLC

(57) ABSTRACT

A method produces a steel sheet having a microstructure including, in area fraction, 20% to 50% intercritical ferrite, 10% to 20% retained austenite, 25% to 45% tempered martensite, 10% to 20% fresh martensite, and bainite. The sum of tempered martensite and bainite is between 30% and 60%. A cold-rolled steel sheet provided includes 0.18% ≤C≤0.25%, 0.9% ≤Si≤1.8%, 0.02% ≤Al≤1.0%, with 1.00% ≤Si+Al≤2.35%, 1.5% ≤Mn≤2.5%, 0.010% ≤Nb ≤0.035%, 0.10% ≤Cr≤0.40%. The steel sheet is annealed to obtain 50% to 80% austenite and 20% to 50% of ferrite, quenched at a cooling rate between 20° C/s and 50° C/s to between Ms-50° C. and Ms-5° C., heated to a partitioning temperature between 375° C. and 450° C. and maintained at the partitioning temperature for at least 50s, then immediately cooled to room temperature.

21 Claims, No Drawings

(56) References Cited

U.S. PATENT DOCUMENTS

| | | |
|---|---|---|
| 2006/0011274 A1 | 1/2006 | Speer et al. |
| 2006/0144482 A1 | 7/2006 | Moulin |
| 2008/0199347 A1 | 8/2008 | Barges et al. |
| 2009/0214377 A1 | 8/2009 | Hennig et al. |
| 2010/0221138 A1 | 9/2010 | Nakaya et al. |
| 2012/0222781 A1 | 9/2012 | Azuma et al. |
| 2013/0133786 A1 | 5/2013 | Matsuda et al. |
| 2013/0133792 A1 | 5/2013 | Nakagaito et al. |
| 2014/0000765 A1* | 1/2014 | Nozaki .............. C21D 8/0263 148/333 |
| 2014/0120371 A1* | 5/2014 | Mbacke .............. C21D 8/0247 148/522 |
| 2014/0234658 A1 | 8/2014 | Nozaki et al. |
| 2014/0242416 A1* | 8/2014 | Matsuda .............. C22C 38/08 428/659 |
| 2014/0311631 A1 | 10/2014 | Hayashi et al. |
| 2014/0342183 A1* | 11/2014 | Wakabayashi .......... C23C 2/02 148/533 |
| 2015/0203947 A1* | 7/2015 | Hasegawa .............. C23C 2/06 148/533 |
| 2015/0337408 A1 | 11/2015 | Schluz et al. |
| 2016/0017472 A1 | 1/2016 | Ennis |
| 2016/0208359 A1 | 7/2016 | Kasuya et al. |
| 2017/0096723 A1 | 4/2017 | Kasuya et al. |
| 2017/0191150 A1* | 7/2017 | Hanlon ................ C22C 38/04 |

FOREIGN PATENT DOCUMENTS

| | | |
|---|---|---|
| CN | 102952996 A | 3/2013 |
| CN | 103069040 A | 4/2013 |
| DE | 102012013113 A1 | 12/2013 |
| EP | 2325346 A1 | 5/2011 |
| EP | 2546368 A1 | 1/2013 |
| EP | 2578718 A1 | 4/2013 |
| EP | 2824210 A1 | 1/2015 |
| EP | 3225708 A1 | 10/2017 |
| EP | 3418418 A1 | 12/2018 |
| JP | 2012041573 A | 3/2012 |
| JP | 2012237042 A | 12/2012 |
| JP | 2013076139 A | 4/2013 |
| JP | 2013237877 A | 11/2013 |
| RU | 2341566 C2 | 12/2008 |
| RU | 2403311 C2 | 11/2010 |
| RU | 2485202 C1 | 6/2013 |
| RU | 2531216 C2 | 10/2014 |
| WO | 2004022794 A1 | 3/2004 |
| WO | WO2007142197 A1 | 12/2007 |
| WO | WO2013047836 A1 | 4/2013 |
| WO | WO2015046339 A1 | 4/2015 |
| WO | WO-2016020899 A1 * | 2/2016 ............... C21D 1/26 |

OTHER PUBLICATIONS

Xie et al. Stability of retained austenite in multi-phase microstructure during austempering and its effect on the ductility of a low carbon steel. Materials Science & Engineering A 603 (2014) 69-75. (Year: 2014).*

John G Speer et al, "Analysis of Microstructure Evolution in Quenching and Partitioning Automotive Sheet Steel," Metallurgical and Materials Transactions A, Sep. 15, 2011, pp. 3591-3601, vol. 42, No. 12, Spring-Verlag, New York.

Guhui Gao et al, "Enhanced ductility and toughness in an ultrahigh-strength Mn—Si—Cr—C steel: The great potential of ultrafine filmy retained austenite," Acta Materialia, Jun. 26, 2014, pp. 425-433, vol. 76, XP055175674.

Kai Zhang et al, "Microstructure and Mechanical Properties of a Nb-Microalloyed Medium Carbon Steel Treated by Quenching-Partitioning Process," Key Engineering Materials, Dec. 1, 2012, pp. 596-599, vol. 531-532, XP055175312.

Guhui Gao et al, "A carbide-free bainite/martensite/austenite triplex steel with enhanced mechanical properties treated by a novel quenching-partitioning-tempering process," Materials Science and Engineering A, Jan. 1, 2013, pp. 165-169, vol. 559, XP055176061.

* cited by examiner

METHOD FOR PRODUCING A STEEL SHEET HAVING IMPROVED STRENGTH, DUCTILITY AND FORMABILITY

The present invention provides a method for producing a high strength steel sheet having improved strength, ductility and formability and to a sheet obtained with the method.

BACKGROUND

To manufacture various equipments such as parts of body structural members and body panels for automotive vehicles, it is known to use coated sheets made of DP (Dual Phase) steels or TRIP (Transformation Induced Plasticity) steels.

It is also known to use steels having a bainitic structure, free from carbides precipitates, with retained austenite, containing about 0.2% of C, about 2% of Mn, about 1.7% of Si, with a yield strength of about 750 MPa, a tensile strength of about 980 MPa, a total elongation of about 8%. These sheets are produced on continuous annealing lines by cooling from an annealing temperature higher than the $Ac_3$ transformation point, down to a holding temperature above the Ms transformation point and maintaining the sheet at the temperature for a given time.

BRIEF SUMMARY OF THE INVENTION

To reduce the weight of the automotive so as to improve their fuel efficiency in view of the global environmental conservation, it is desirable to have sheets having improved yield and tensile strengths. But such sheets must also have a good ductility and a good formability.

In this respect, it is desirable to have coated or uncoated sheets having a yield strength YS comprised between 440 MPa and 750 MPa, preferably comprised between 450 MPa and 750 MPa, a tensile strength TS of at least 980 MPa, a total elongation TE of at least 20%, preferably of at least 21%, and a hole expansion ratio HER according to ISO standard 16630:2009 of at least 20%. The tensile strength TS and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are very different, and are in particular lower, than the values of the total elongation measured according to the JIS Z 2201-05 standard. Also, due to differences in the methods of measurement, the values of hole expansion ratio HER according to the ISO standard are very different and not comparable to the values of the hole expansion ratio A according to the JFS T 1001 (Japan Iron and Steel Federation standard).

It is also desirable to have steel sheets having the yield strength YS, tensile strength TS, total elongation TE and hole expansion ratio HER as mentioned above, in a thickness range from 0.7 to 3 mm, and more preferably in the range of 1 to 2 mm.

Therefore, an object of the present invention is to provide a sheet with the mechanical properties mentioned above and a method to produce it.

The present invention provides a method for producing a steel sheet having a microstructure consisting, in area fraction, of 20% to 50% of intercritical ferrite, 10% to 20% of retained austenite, 25% to 45% of tempered martensite, 10% to 20% of fresh martensite, and bainite, the sum of tempered martensite and bainite being comprised between 30% and 60%, wherein the method comprises the following successive steps:

providing a cold-rolled steel sheet having a chemical composition of the steel containing in weight %:
  $0.18\% \leq C \leq 0.25\%$,
  $0.9\% \leq Si \leq 1.8\%$,
  $0.02\% \leq Al \leq 1.0\%$,
  with $1.0\% \leq Si+Al \leq 2.35\%$,
  $1.5\% \leq Mn \leq 2.5\%$,
  $0.010\% \leq Nb \leq 0.035\%$,
  $0.10\% \leq Cr \leq 0.40\%$,
the remainder being Fe and unavoidable impurities, annealing the steel sheet at an annealing temperature $T_A$ and for an annealing time $t_A$ so as to obtain a structure comprising from 50% to 80% of austenite and from 20% to 50% of ferrite, quenching the sheet at a cooling rate comprised between 20° C./s and 50° C./s down to a quenching temperature QT comprised between Ms-50° C. and Ms-5° C., heating the sheet up to a partitioning temperature PT comprised between 375° C. and 450° C. and maintaining the sheet at the partitioning temperature PT for a partitioning time Pt of at least 50 s, cooling the sheet down to the room temperature.

Preferably, the steel sheet has, just after quenching, a structure consisting of, in area fraction, at least 20% of austenite, between 30% and 60% of martensite and from 20% and 50% of ferrite.

According to a preferred embodiment, the composition of the steel is such that $1.25\% \leq Si+Al \leq 2.35\%$.

According to a preferred embodiment, the method further comprises, between the step of maintaining the sheet at the partitioning temperature PT and the step of cooling the sheet down to the room temperature, a step of hot dip coating the sheet.

In this embodiment, the partitioning temperature PT is preferably comprised between 400° C. and 430° C., and the partitioning time Pt is preferably comprised between 50 s and 150 s.

For example, the hot dip coating step is a galvanizing step.

According to another example, the hot dip coating step is a galvannealing step, with an alloying temperature GAT comprised between 480° C. and 515° C. Preferably, in this example, the partitioning time Pt is comprised between 50 s and 140 s.

According to another preferred embodiment, the step of cooling the sheet down to the room temperature is performed immediately after the step of maintaining the sheet at the partitioning temperature PT for the partitioning time Pt, and the partitioning time Pt is of at least 100 s.

Preferably, the sheet is cooled down to the room temperature at a cooling rate of at least 10° C./s.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

The invention also provides a steel sheet having a chemical composition comprising, in weight %:
  0.18% C 0.25%,
  0.9% Si 1.8%,
  0.02% Al 1.0%,
  with 1.0% Si+Al 2.35%,
  1.5% Mn 2.5%,
  0.010% Nb 0.035%,
  0.10% Cr 0.40%, the remainder being Fe and unavoidable impurities,
wherein the microstructure of the steel consists of, in area fraction:
- 20% to 50% of intercritical ferrite,
- 10% to 20% of retained austenite,
- 25% to 45% of tempered martensite,
- bainite, the sum of tempered martensite and bainite being comprised between 30% and 60%,
- 10% to 20% of fresh martensite.

Preferably, the steel sheet has a yield strength comprised between 440 and 750 MPa, a tensile strength of at least 980 MPa, a total elongation, measured according to ISO standard ISO 6892-1, of at least 20%, and a hole expansion ratio HER, measured according to ISO standard 16630:2009, of at least 20%.

According to a preferred embodiment, the composition of the steel is such that 1.25% Si+Al 2.35%.

Preferably the C content $C_{RA}\%$ in the retained austenite is comprised between 0.9% and 1.3%.

According to a particular embodiment, the steel sheet is coated, for example with a Zn or Zn alloy or an Al or an Al alloy.

For example, the steel sheet is galvanized or galvannealed.

DETAILED DESCRIPTION

The invention will now be described in details but without introducing limitations.

The composition of the steel according to the invention comprises, in weight percent:
- 0.18% to 0.25% of carbon, and preferably 0.19% to 0.22%, to ensure a satisfactory strength and improve the stability of the retained austenite. This retained austenite content is necessary to obtain a sufficient total elongation. If carbon content is above 0.25%, the hot rolled sheet is too hard to cold roll and the weldability is insufficient. If carbon content is below 0.18%, yield and tensile strength levels will not reach respectively 450 and 980 MPa, and the total elongation will not reach 20%;
- 1.5% to 2.5% of manganese. The minimum is defined to have a sufficient hardenability in order to obtain a microstructure containing at least 30% of the sum of martensite and bainite, and a tensile strength of more than 980 MPa. The maximum is defined to avoid having segregation issues which are detrimental for the ductility;
- 0.9% to 1.8% of silicon in order to stabilize the austenite, to provide a solid solution strengthening and to delay the formation of carbides during overaging, i.e. during the maintaining at the partitioning temperature PT, without formation of silicon oxides at the surface of the sheet which would be detrimental to coatability. Preferably, the silicon content is higher than or equal to 1.1%. An increased amount of silicon improves the hole expansion ratio. Preferably, the silicon content is lower than or equal to 1.7%. A silicon content above 1.8% would lead to formation of silicon oxides at the surface;
- 0.02% to 1.0% of aluminum. Aluminum is added to deoxidize the liquid steel and it increases the robustness of the manufacturing method, in particular reduces the variations of the austenite fraction when the annealing temperature varies. The maximum aluminum content is defined to prevent an increase of the $Ac_3$ transformation point to a temperature which would render the annealing more difficult. Aluminum, as silicon, delays the formation of carbides during carbon redistribution from martensite to austenite resulting from the overaging. To delay the formation of carbides the minimum content of Al+Si should be 1.0%, preferably 1.25%. The maximum content of Al+Si should be 2.35%. Thus, according to a first embodiment, 1.0%≤Al+Si<1.25%. According to a second embodiment, 1.25%≤Al+Si≤2.35%;
- 0.10% to 0.40% of chromium. At least 0.10% is needed to increase the hardenability and to stabilize the retained austenitic in order to delay the formation of bainite during overaging. A maximum of 0.40% of Cr is allowed, above a saturation effect is noted, and adding Cr is both useless and expensive. Furthermore, a Cr content higher than 0.40% would lead to the formation of scale comprising chromium oxides strongly adhering to the surface of the steel sheet during hot-rolling and cold-rolling, very difficult to remove by pickling;
- 0.010% to 0.035% of niobium, in order to refine the prior austenite grains and to provide precipitation strengthening. A Nb content of 0.010% to 0.035% allows obtaining a satisfactory yield strength and elongation, in particular a yield strength of at least 440 MPa.

The balance is iron and residual elements resulting from the steelmaking. In this respect, Ni, Mo, Cu, Ti, V, B, S, P and N at least are considered as residual elements which are unavoidable impurities. Therefore, their contents are less than 0.05% for Ni, 0.02% for Mo, 0.03% for Cu, 0.007% for V, 0.0010% for B, 0.005% for S, 0.02% for P and 0.010% for N. The Ti content is limited to 0.05% because above such values, large-sized carbonitrides would precipitate mainly in the liquid stage, and the formability of the steel sheet would decrease, making the 20% target for the total elongation more difficult to reach.

The sheet is prepared by hot rolling and cold rolling according to the methods known to one skilled in the art. The cold-rolled sheet has a thickness between 0.7 mm and 3 mm, for example between 1 mm and 2 mm.

After rolling, the sheet is pickled or cleaned, then heat treated, and either hot dip coated, electro-coated or vacuum coated.

The heat treatment, which is preferably made on a combined continuous annealing and hot dip coating line, comprises the steps of:
- annealing the sheet at an annealing temperature $T_A$ such that, at the end of the annealing step, the steel has a structure consisting of 50% to 80% of austenite and 20% to 50% of ferrite, preferably 25% to 50% of ferrite. One skilled in the art knows how to determine the annealing temperature $T_A$ from dilatometry tests. Generally, the annealing temperature is comprised between 780° C. and 840° C. Preferably, the sheet is heated to the annealing temperature at a heating rate of at least 3° C./s. The sheet is maintained at the annealing temperature i.e. maintained between $T_A-5°$ C. and $T_A+10°$ C., for an annealing time $t_A$ sufficient to homogenize the chemical composition. This annealing time $t_A$ is preferably of more than 30 s but does not need to be of more than 300 s. Preferably, the annealing time is of at least 70 s;
- quenching the sheet down to a quenching temperature QT lower than the Ms transformation point of the austenite remaining after annealing, at a cooling rate high enough to avoid the formation of new ferrite and bainite during cooling. Cr is helpful to avoid such formation. For example, the cooling rate is higher than 20° C./s. The quenching temperature is between Ms-50° C. and Ms-5° C. in order to have a structure consisting of at least 20% of austenite, between 30% and 60% of martensite and from 20% and 50% of ferrite, which is intercritical ferrite, just after cooling. If the quenching temperature QT is lower than Ms-50° C., the fraction of the tempered and non-tempered martensite in the final structure is too high to stabilize a sufficient amount of retained austenite above 10%, and a total elongation of at least 20% is not obtained. Moreover, if the quenching temperature QT is higher than Ms-5° C., the fraction of martensite formed is too low, so that the partitioning of carbon during the subsequent partitioning step is insufficient. Consequently, the austenite is not sufficiently stabilized to obtain the desired fraction of retained austenite after cooling to the room temperature, and an elongation of at least 20% is not obtained;

optionally holding the quenched sheet at the quenching temperature for a holding time comprised between 2 s and 8 s, preferably between 3 s and 7 s;

reheating the sheet from the quenching temperature up to a partitioning temperature PT comprised between 375° C. and 450° C., and preferably comprised between 375° C. and 430° C. If the partitioning temperature PT is higher than 450° C., a total elongation of more than 20% is not obtained. If the partitioning temperature PT is lower than 430° C., a total elongation of at least 21% can be obtained. Preferably, if the sheet is to be hot dip coated, for example by galvanizing or galvannealing, the partitioning temperature PT is comprised between 400° C. and 430° C. The reheating rate can be high when the reheating is made by induction heater, but that reheating rate had no apparent effect on the final properties of the sheet;

maintaining the sheet at the partitioning temperature PT for a partitioning time Pt of at least 50 s, for example comprised between 50 s and 250 s. During the partitioning step, the carbon is partitioned, i.e. diffuses from the martensite into the austenite which is thus enriched in carbon and stabilized. If the sheet is to be galvanized, the partitioning time Pt is preferably comprised between 50 s and 150 s. If the sheet is to be galvannealed, the partitioning time Pt is preferably comprised between 50 s and 140 s. If the sheet is not hot-dip coated, the partitioning time is preferably of at least 100 s;

optionally, if the sheet is to be hot-dip coated, the temperature of the sheet is adjusted by cooling or heating in order to be equal to the temperature at which the sheet has to be hot dip coated;

optionally hot dip coating the sheet. The optional hot dip coating can be, for example, galvanizing but all metallic hot dip coating is possible provided that the temperatures at which the sheet is brought to during coating remain less than 480° C. When the sheet is galvanized, it is done with the usual conditions. The steel sheet according to the invention can be galvannealed, at a galvannealing temperature comprised between 480° C. and 515° C., for example comprised between 480° C. and 500° C., to alloy the Zn coating by inter-diffusion with Fe is performed after the steel is dipped in the Zn bath. If the galvannealing temperature is higher than 515° C., the total elongation decreases to less than 20%. The steel according to the invention can also galvanized with Zn alloys like zinc-magnesium or zinc-magnesium-aluminum;

cooling the sheet to the room temperature, after the hot-dip coating step or immediately after the step of maintaining the sheet at the partitioning temperature, at a cooling rate preferably higher than 10° C./s.

Instead of using hot dip coating, the sheet can be coated by electrochemical methods, for example electro-galvanizing, or through any vacuum coating process, like Plasma Vapor Deposition or Jet Vapor Deposition. There again, any kind of coatings can be used and in particular, zinc or zinc alloys, like zinc-nickel, zinc-magnesium or zinc-magnesium-aluminum alloys.

This treatment makes it possible to obtain a final structure i.e. after partitioning, optional hot-dip coating and cooling to the room temperature, consisting of 20% to 50% of intercritical ferrite, 10% to 20% of retained austenite, 25% to 45% of tempered martensite, 10% to 20% of fresh martensite, and bainite, the sum of tempered martensite and bainite being comprised between 30% and 60%.

Furthermore, this treatment allows obtaining an increased C content in the retained austenite, which is of at least 0.9%, preferably even of at least 1.0%, and up to 1.3%.

With such treatment, sheets having a yield strength YS comprised between 450 and 750 MPa, a tensile strength of at least 980 MPa, a total elongation of at least 20%, and even higher than 21%, and a hole expansion ratio HER according to the ISO standard 16630:2009 of at least 20% can be obtained.

The following examples are for the purposes of illustration and are not meant to be construed to limit the scope of the disclosure herein:

EXAMPLES

As an example, sheets made of a steel having a composition comprising 0.21% of C, 1.5% of Si, 1.9% of Mn, 0.015% of Nb, 0.2% of Cr and 0.02% of Al, the remainder being Fe and impurities (composition n° 1), were produced by hot rolling and cold rolling.

The Ac1, Ac3 and Ms points of the steel were determined by dilatometer experiments, as being Ac1=780° C., Ac3=900° C. and Ms=250° C.

First samples of the sheet were heat treated by annealing at a temperature TA for a time $t_A$, quenching at a temperature QT at a cooling rate of 50° C./s, reheated to a partitioning temperature PT and maintained at the partitioning temperature PT for a partitioning time Pt, then immediately cooled to room temperature.

The heat treatment conditions and the obtained properties are reported in table I.

In the tables below, TA is the annealing temperature, $t_A$ is the annealing time, QT the quenching temperature, PT the partitioning temperature, Pt the maintaining time at the partitioning temperature, YS the yield strength, TS the tensile strength, UE the uniform elongation, TE the total elongation and HER the hole expansion ratio measured according to the ISO standard.

In table I and tables II-IV below, the numbers underlined are not according to the invention, and "nd" means that the properties were not determined.

TABLE I

| Example | $T_A$ (° C.) | $t_A$ (s) | QT (° C.) | PT (° C.) | Pt (s) | YS (Mpa) | TS (Mpa) | UE (%) | TE (%) | HER (%) |
|---|---|---|---|---|---|---|---|---|---|---|
| 1 | 820 | 120 | 175 | 400 | 150 | 691 | 1054 | 12.1 | 16.9 | nd |
| 2 | | | 200 | | | 694 | 1062 | 14.2 | 21.8 | nd |
| 3 | | | 225 | | | 612 | 1016 | 15.4 | 21.5 | 31 |
| 4 | | | 250 | | | 594 | 996 | 10.5 | 10.4 | nd |
| 5 | | | 225 | 375 | 150 | 489 | 996 | 15.6 | 21.4 | nd |
| 6 | | | | 400 | | 612 | 1016 | 15.4 | 21.5 | 31 |
| 7 | | | | 425 | | 526 | 980 | 17 | 21.6 | nd |
| 8 | | | | 450 | | 440 | 1011 | 15.6 | 20.4 | nd |
| 9 | | | 225 | 400 | 50 | 520 | 1030 | 12.9 | 15.1 | 20.6 |
| 10 | | | | | 80 | 601 | 1035 | 13.7 | 18.1 | 28 |
| 11 | | | | | 100 | 639 | 1039 | 16.3 | 23.5 | 30.2 |
| 12 | | | | | 150 | 612 | 1016 | 15.4 | 21.5 | 31 |

For examples 1-12, the annealing temperature was 820° C., which led to a structure, after the annealing step, consisting of 65% of austenite and 35% of intercritical ferrite.

Examples 1 to 4 illustrate the influence of the quenching temperature on the mechanical properties obtained. These examples show that when the quenching temperature QT is below or above the range Ms-50° C.-Ms-5° C., the total elongation TE does not reach 20%.

Examples 5 to 8 illustrate the variations of the mechanical properties with the partitioning temperature PT, example 6 being identical to example 3. These examples show that when the partitioning temperature PT is comprised between 375° C. and 450° C., the mechanical properties reach the targeted values.

In particular, if the partitioning temperature PT is comprised between 375° C. and 425° C., the tensile elongation TE is even of more than 21% and the yield strength of more than 450 MPa.

Examples 10 to 12 illustrate the influence of the partitioning time Pt on the mechanical properties, for a sheet which is not hot-dip coated. Example 12 is identical to examples 3 and 6.

These examples show that, in the absence of a hot-dip coating step, a partitioning time Pt of at least 100 s allows obtaining a yield strength comprised between 440 and 750 MPa, a tensile strength of more than 980 MPa, a total elongation of more than 20%, even higher than 21%, and a hole expansion ratio higher than 20%, and even more higher than 30%.

Other samples of the sheet were heat treated by annealing at a temperature TA for a time $t_A$, so as to obtain a structure comprising from 50% to 80% of austenite and from 20% to 50% of ferrite, quenching at a temperature QT at a cooling rate of 50° C./s, reheated to a partitioning temperature PT, maintained at the partitioning temperature PT for a partitioning time Pt, galvanized at 430° C. and cooled to room temperature.

The heat treatment conditions and the obtained properties are reported in table II.

Examples 13 to 15 illustrate the variations of the mechanical properties with the partitioning temperature PT for a galvanized sheet. These examples show that, when the sheet is galvanized, a partitioning temperature PT comprised between 400° C. and 430° C. allows obtaining a total elongation TE higher than 20%, the total elongation TE being lowered with increased partitioning temperatures.

Examples 16 to 18 illustrate the influence of the quenching temperature QT on the properties obtained, with annealing temperatures TA of 820° C. or 840° C. These examples show that when the quenching temperature is comprised between Ms-50° C. and Ms-5° C., the mechanical properties obtained are satisfactory. However, when the quenching temperature QT is higher than Ms-5° C., the total elongation TE is lower than 20%, which is due to the formation of a too low fraction of martensite.

Examples 19 to 24 illustrate the variation of the mechanical properties obtained with the partitioning temperature PT, when the quenching temperature QT is 200° C. (examples 19 to 21) or 225° C. (examples 22 to 24). These examples show that when the partitioning temperature PT is too high, a total elongation of more than 20% is not obtained.

TABLE II

| Example | $T_A$ (° C.) | $t_A$ (s) | QT (° C.) | PT (° C.) | Pt (s) | YS (MPa) | TS (MPa) | UE (%) | TE (%) | HER (%) |
|---|---|---|---|---|---|---|---|---|---|---|
| 13 | 820 | 120 | 225 | 400 | 100 | 459 | 1054 | 17.4 | 22.2 | 20.3 |
| 14 | | | | 415 | | 449 | 1042 | 17.2 | 23.6 | nd |
| 15 | | | | 430 | | 440 | 1076 | 17.1 | 23.2 | nd |
| 16 | 820 | 136 | 200 | 400 | 100 | 450 | 1061 | 18 | 25.4 | nd |
| 17 | 840 | | 225 | | | 470 | 1076 | 16.9 | 23.5 | nd |
| 18 | 840 | | 250 | | | 491 | 1073 | 15.7 | 17.4 | nd |
| 19 | 800 | 136 | 200 | 400 | 100 | 644 | 1072 | 16.5 | 23.3 | nd |
| 20 | | | | 430 | | 611 | 1096 | 16.8 | 23.3 | nd |
| 21 | | | | 460 | | 501 | 1142 | 13.3 | 16.8 | nd |
| 22 | 820 | 136 | 225 | 400 | 100 | 605 | 1068 | 16.9 | 23.1 | nd |
| 23 | | | | 430 | | 618 | 1100 | 15.2 | 20.3 | nd |
| 24 | | | | 460 | | 645 | 1176 | 13.4 | 19.1 | nd |
| 25 | 820 | 85 | 225 | 400 | 62 | 504 | 1080 | 16.9 | 20.2 | nd |
| 26 | | 172 | | | 124 | 589 | 1057 | 16.7 | 21 | nd |

Examples 25 and 26 illustrate the variation of the mechanical properties achieved when the annealing time $t_A$ and the partitioning time Pt vary. These examples show that, even if the desired mechanical properties are always obtained when the annealing time $t_A$ varies and when the annealing time Pt is of at least 50 s, the yield strength YS and the total elongation TE are improved when the annealing time $t_A$ and the partitioning time Pt increase.

Other samples of the sheet were heat treated by annealing at a temperature $T_A$ for a time $t_A$, so as to obtain a structure comprising from 50% to 80% of austenite and from 20% to 50% of ferrite, quenching at a temperature QT at a cooling rate of 50° C./s, reheated to a partitioning temperature PT, maintained at the partitioning temperature PT for a partitioning time Pt, galvannealed at various galvannealing temperature GAT, then cooled to room temperature.

The heat treatment conditions and the obtained properties are reported in table III.

TABLE III

| Example | $T_A$ (° C.) | $t_A$ (s) | QT (° C.) | PT (° C.) | Pt (s) | GAT (° C.) | YS (MPa) | TS (MPa) | UE (%) | TE (%) | HER (%) |
|---|---|---|---|---|---|---|---|---|---|---|---|
| 27 | 820 | 120 | 225 | 400 | 50 | 480 | 601 | 1011 | 15.5 | 22 | 23.9 |
| 28 | | | | | 100 | | 608 | 994 | 17 | 26.2 | 27.3 |
| 29 | | | | | 50 | 500 | 574 | 1020 | 15.2 | 20.5 | 25.5 |
| 30 | | | | | 100 | | 583 | 998 | 16.6 | 24.1 | 26.8 |
| 31 | | | | | 50 | 520 | 537 | 1008 | 12.8 | 17.2 | nd |
| 32 | | | | | 100 | | 538 | 985 | 14.1 | 19.5 | nd |

These examples show that when the galvannealing temperature GAT is comprised between 480° C. and 515° C., the targeted mechanical properties are obtained either with a partitioning time Pt of 50 s or a partitioning time Pt of 100 s. When the galvannealing temperature GAT is 520° C., the total elongation drops to below 20%.

Further tests were performed to study the influence of the line speed on the mechanical properties of the sheet during the manufacture, i.e. the stability of these mechanical properties with variations of the line speed.

These tests were performed on a continuous annealing line having a minimum line speed of 50 m/min and a maximum line speed of 120 m/min, with soaking and partitioning sections configured so that the maximum soaking time and partitioning time, reached with the minimum line speed, are respectively of 188 s and 433 s. The minimum soaking time and partitioning time, reached with the maximum line speed, are respectively 79 s and 188 s.

The tests were performed using the minimum and the maximum line speeds, with a quenching temperature QT of 225° C. and a partitioning temperature PT of 400° C. The sheets were not coated.

The heat treatment conditions and the obtained properties are reported in table IV.

TABLE IV

| Example | $T_A$ (° C.) | $t_A$ (s) | QT (° C.) | PT (° C.) | Pt (s) | YS (MPa) | TS (MPa) | UE (%) | TE (%) | HER (%) |
|---|---|---|---|---|---|---|---|---|---|---|
| 33 | 820 | 79 | 225 | 400 | 181 | 604 | 985 | 16.2 | 24.6 | 23.3 |
| 34 | | 188 | | | 433 | 665 | 994 | 15.2 | 21.8 | 28.2 |

These tests show that the line speed has little influence on the quality of the mechanical properties obtained, so that the targeted properties can be obtained throughout the whole range of line speeds. These results also show that the manufacturing process is very robust with regard to variations of the line speed.

Additional tests were performed with steels having the compositions reported in Table V. In Table V, only the C, Mn, Si, Cr, Nb and Al contents are reported, the remainder of the compositions being iron and unavoidable impurities. The Ac1, Ac3 and Ms points of the steel, determined by dilatometer experiments, are also reported in Table V.

TABLE V

| Composition no | C (%) | Mn (%) | Si (%) | Cr (%) | Nb (%) | Al (%) | Ac1 (° C.) | Ac3 (° C.) | Ms (° C.) |
|---|---|---|---|---|---|---|---|---|---|
| 2 | 0.22 | 1.9 | 1.5 | 0.2 | 0.03 | 0.05 | 770 | 875 | 240 |
| 3 | 0.22 | 1.9 | 1.0 | 0.2 | 0.03 | 0.05 | 770 | 860 | 230 |
| 4 | 0.22 | 1.9 | 1.0 | 0.2 | 0.03 | 0.5 | 760 | 915 | 180 |

Steel sheets having these compositions were produced by hot rolling and cold rolling.

Samples of these sheets were heat treated by annealing at a temperature TA for a time tA, so as to obtain a structure comprising from 50% to 80% of austenite and from 20% to 50% of ferrite, quenching at a temperature QT at a cooling rate of 50° C./s, reheated to a partitioning temperature PT and maintained at the partitioning temperature PT for a partitioning time Pt, galvanized at 430° C. and cooled to room temperature.

The heat treatment conditions and the obtained properties are reported in table VI.

In table VI below, "nd" means that the properties were not determined.

TABLE VI

| Example | Composition no | $T_A$ (° C.) | $t_A$ (s) | QT (° C.) | PT (° C.) | Pt (s) | YS (MPa) | TS (MPa) | UE (%) | TE (%) | HER (%) |
|---|---|---|---|---|---|---|---|---|---|---|---|
| 35 | 2 | 800 | 136 | 200 | 400 | 100 | 472 | 1074 | 16.6 | 20 | nd |
| 36 | 2 | 820 | 136 | 225 | 400 | 100 | 459 | 1045 | 16.8 | 20.6 | nd |
| 37 | 3 | 800 | 136 | 200 | 400 | 100 | 544 | 1007 | 18.2 | 22.4 | nd |
| 38 | 3 | 800 | 85 | 225 | 400 | 62 | 494 | 989 | 17.2 | 21 | nd |
| 39 | 3 | 800 | 136 | 225 | 400 | 100 | 520 | 987 | 18.2 | 21.7 | nd |
| 40 | 3 | 820 | 85 | 225 | 400 | 62 | 578 | 1035 | 16.4 | 20.8 | nd |
| 41 | 4 | 820 | 136 | 150 | 400 | 100 | 606 | 1019 | 17.5 | 22.3 | nd |
| 42 | 4 | 900 | 136 | <u>325</u> | 400 | 100 | 1091 | 1200 | 6.4 | <u>9.9</u> | nd |

Samples 35-41 were produced by a method according to the invention, and have a yield strength comprised between 440 and 750 MPa, a tensile strength of at least 980 MPa, and a total elongation of at least 20%.

Sample 42 was quenched to a temperature above Ms (Ms=180° C.), so that an insufficient fraction of austenite could be stabilized during the partitioning. As a consequence, sample 42 has a total elongation well below 20%.

Other samples of the sheet having the composition n° 4 were heat treated by annealing at a temperature $T_A$ for a time $t_A$, so as to obtain a structure comprising from 50% to 80% of austenite and from 20% to 50% of ferrite, quenching at a temperature QT at a cooling rate of 50° C./s, reheated to a partitioning temperature PT, maintained at the partitioning temperature PT for a partitioning time Pt, galvannealed at various galvannealing temperature GAT, then cooled to room temperature.

The heat treatment conditions and the obtained properties are reported in table VII.

TABLE VII

| Example | Composition no | $T_A$ (°C.) | $t_A$ (s) | QT (°C.) | PT (°C.) | Pt (s) | GAT (°C.) | YS (MPa) | TS (MPa) | UE (%) | TE (%) | HER (%) |
|---|---|---|---|---|---|---|---|---|---|---|---|---|
| 43 | 4 | 800 | 136 | 160 | 400 | 100 | 500 | 539 | 1051 | 15.4 | 20.5 | 21 |
| 44 | 4 | 820 | | | | | | 621 | 1049 | 15.7 | 21.4 | 23 |
| 45 | 4 | 820 | | | | | 520 | 609 | 1057 | 12.8 | <u>18.9</u> | nd |

These examples show that when the galvannealing temperature GAT is comprised between 480° C. and 515° C., the targeted mechanical properties are obtained. When the galvannealing temperature GAT is 520° C., the total elongation drops to below 20%.

Further tests were performed to study the influence of the line speed on the mechanical properties of a sheet having the composition n° 3 during the manufacture, i.e. the stability of these mechanical properties with variations of the line speed.

These tests were performed on a continuous annealing line having a minimum line speed of 50 m/min and a maximum line speed of 120 m/min, with soaking and partitioning sections configured so that the maximum soaking time and partitioning time, reached with the minimum line speed, are respectively of 188 s and 433 s. The minimum soaking time and partitioning time, reached with the maximum line speed, are respectively 79 s and 188 s.

The tests were performed using the minimum and the maximum line speeds. The sheets were not coated.

The heat treatment conditions and the obtained properties are reported in table VIII.

TABLE VII

| Example | Composition no | $T_A$ (°C.) | $t_A$ (s) | QT (°C.) | PT (°C.) | Pt (s) | YS (MPa) | TS (MPa) | UE (%) | TE (%) | HER (%) |
|---|---|---|---|---|---|---|---|---|---|---|---|
| 46 | 3 | 800 | 79 | 200 | 400 | 181 | 683 | 990 | 16.5 | 20.2 | nd |
| 47 | 3 | | 188 | | | 433 | 707 | 955 | 19.2 | 23.9 | nd |

These tests show again that the line speed has little influence on the quality of the mechanical properties obtained, so that the targeted properties can be obtained throughout the whole range of line speeds. These tests also show that the manufacturing process is very robust with regard to variations of the line speed.

What is claimed is:

1. A steel sheet, comprising:
   a chemical composition comprising, by weight:
   18% ≤C≤0.25%,
   0.9% ≤Si≤1.8%,
   0.02% ≤Al≤1.0%,
   with 1.0% ≤Si+Al≤2.35%,
   1.5% ≤Mn≤2.5%,
   0.010% ≤Nb≤0.035%,
   0.10% ≤Cr≤0.40%, and
   a remainder, the remainder including Fe and unavoidable impurities; and
   a microstructure consisting of, in area fraction:
   20% to 50% intercritical ferrite,
   10% to 20% retained austenite,
   25% to 45% tempered martensite,
   bainite,
   a sum of the tempered martensite and the bainite area fractions being between 30% and 60%, and
   10% to 20% fresh martensite,
   wherein the steel sheet has a yield strength between 440 and 750 MPa, a tensile strength of at least 980 MPa, a total elongation of at least 20%, and a hole expansion ratio HER according to ISO standard 16630:2009 of at least 20%.

2. The steel sheet according to claim 1, wherein the chemical composition of the steel includes 1.25% ≤Si+Al≤2.35%.

3. The steel sheet according to claim 1, wherein the retained austenite has a C content $C_{RA}$% between 0.9% and 1.3%.

4. The steel sheet according to claim 1, wherein the steel sheet has a product of the tensile strength by total elongation of at most 26949 MPa %.

5. The steel sheet according to claim 1, wherein the steel sheet is coated.

6. The steel sheet according to claim 5, wherein the steel sheet is coated with a Zn or Zn alloy.

7. The steel sheet according to claim 6, wherein the steel sheet is galvanized.

8. The steel sheet according to claim 6, wherein the steel sheet is galvannealed.

9. The steel sheet according to claim 5, wherein the steel sheet is coated with an Al or an Al alloy.

10. A method for producing the steel sheet of claim 1 having a microstructure consisting of, in area fraction, 20% to 50% intercritical ferrite, 10% to 20% retained austenite, 25% to 45% tempered nnartensite, 10% to 20% fresh martensite, and bainite, with a sum of the tempered martensite and the bainite area fractions being between 30% and 60%, the method for producing a steel sheet comprising the successive steps of:
   providing a cold-rolled steel sheet, made of a steel having a chemical composition containing by weight:
   0.18% ≤C≤0.25%,
   0.9% ≤Si≤1.8%,
   0.02% ≤Al≤1.0%,
   with 1.0% ≤Si+Al≤2.35%,
   1.5% ≤Mn≤2.5%,
   0.010% ≤Nb≤0.035%,
   0.10% ≤Cr≤0.40%, and
   a remainder, the remainder including Fe and unavoidable impurities;
   annealing the steel sheet at an annealing temperature $T_A$ for an annealing time $t_A$ to obtain a structure comprising from 50% to 80% austenite and from 20% to 50% ferrite;
   quenching the steel sheet at a cooling rate between 20° C/s and 50° C/s down to a quenching temperature QT between Ms-50° C. and Ms-5° C.;

heating the steel sheet up to a partitioning temperature PT between 375° C. and 450° C.;

maintaining the steel sheet at the partitioning temperature PT for a partitioning time Pt of at least 50s; and cooling the steel sheet down to room temperature.

11. The method according to claim 10, wherein the steel sheet has, just after quenching a structure consisting of, in area fraction, at least 20% austenite, between 30% and 60% martensite, and between 20% and 50% ferrite.

12. The method according to claim 10, wherein the chemical composition of the steel includes 1.25% ≤Si+Al≤2.35%.

13. The method according to claim 10, further comprising a step of:

hot dip coating the steel sheet between the step of maintaining the steel sheet at the partitioning temperature PT and the step of cooling the steel sheet down to the room temperature.

14. The method according to claim 13, wherein the partitioning temperature PT is between 400° C. and 430° C.

15. The method according to claim 13, wherein the partitioning time Pt is between 50s and 150s.

16. The method according to claim 13, wherein the hot dip coating step is a galvanizing step.

17. The method according to claim 13, wherein the hot dip coating step is a galvannealing step, with an alloying temperature between 480° C. and 515° C.

18. The method according to claim 17, wherein the partitioning time Pt is between 50s and 140s.

19. The method according to claim 10, wherein the step of cooling the steel sheet down to the room temperature is performed immediately after the step of maintaining the steel sheet at the partitioning temperature PT for the partitioning time Pt, and wherein the partitioning time Pt is at least 100s.

20. The method according to claim 10, wherein the steel sheet is cooled down to the room temperature at a cooling rate of at least 10° C/s.

21. The method according to claim 10, further comprising the step of:

holding the steel sheet at the quenching temperature QT for a holding time between 2 s and 8 s after the steel sheet is quenched to the quenching temperature QT and before the steel sheet is heated to the partitioning temperature PT.

* * * * *